Sept. 9, 1969  W. TRANKNER ET AL  3,465,660
EXPOSURE MEASURING DEVICE IN PHOTOGRAPHIC MIRROR REFLEX CAMERAS
Filed Jan. 9, 1967  3 Sheets-Sheet 2

INVENTORS
WERNER TRANKNER
ROLF JURENZ
By Young + Thompson
ATTYS.

INVENTORS
WERNER TRANKNER
ROLF JURENZ
BY Young & Thompson
ATTYS.

United States Patent Office 3,465,660
Patented Sept. 9, 1969

3,465,660
EXPOSURE MEASURING DEVICE IN PHOTO-
GRAPHIC MIRROR-REFLEX CAMERAS
Werner Trankner and Rolf Jurenz, Dresden, Germany,
assignors to VEB Pentacon Dresden Kamera- und Kino-
werke, Dresden, Germany
Filed Jan. 9, 1967, Ser. No. 608,056
Int. Cl. G03b 19/12; G01j 1/00, 1/52
U.S. Cl. 95—42                                    13 Claims

ABSTRACT OF THE DISCLOSURE

A photographic mirror reflex camera has a pentagonal roof prism provided with a partly permeable image erecting surface against which is located a frusto-conical or frusto-pyramidal light conductive or collective prism which has a plane surface at one end which removes part of the base of the cone or pyramid which plane is opposite to and approximately the same size as the erecting surface and a plane surface at the other end which cuts off the apex and is opposite to a photoelectric cell. The base of the cone or pyramid is approximately parallel to the roof prism edge that is remote from the apex. By this construction the light outlet surface of the collecting prism is much smaller than its light entry surface and the whole of the light flux passing through the erecting surface arrives with a high degree of luminosity and without appreciable loss on the photoelectric cell.

BACKGROUND OF THE INVENTION

The invention relates to an exposure measuring device in photographic mirror reflex cameras, in which device the light flux coming from the exposure lens system is conveyed via a partially mirror-coated reflective surface, preferably via a prism system and intercalated photoconductive devices, to a photoelectric converter.

The exposure measurement in mirror-reflex cameras in the path of the viewfinder rays is usually carried out by reflecting part of the light flux of the viewfinder. In these cases at least one additional partially reflective surface is required, this being mounted in the path of the viewfinder rays. As a rule, however, further optical components are required, such as prisms, light collecting systems, etc., in order to fulfill the measuring requirements with as few limitations as possible.

Further internal measuring devices are known, in which the reflex-mirror forms a special unit with the photoelectric receiver, or systems in which the receiver or receivers are situated in the vicinity of the eyepiece, to some extent with the inclusion of photoconductive means. In these latter systems the false light and stray light, caused by a greater or lesser degree of delustering (dull finish) on the image field lens, is utilised for the measurement.

In a further known construction the receiver is situated immediately behind the image erecting surface of a pentagonal roof prism, in which case the photoelectric converter occupies the entire image erecting surface of the prism, in order to ensure integral measurement.

Finally, exposure measuring devices are known for the purpose of measuring a ground glass screen image or viewfinder image, with a photoelectric cell provided by the side of a reflective surface which scans the image, the mirror coated reflective surface being connected with the photoelectric cell by a photoconductive rod which is transparent in the direction of the path of the image rays. The photoconductive rod, which is also known as a light collector and which has properties by which the aperture is increased, may possess, at its ends, cross sections which need not be equal to the light entry surface.

The exposure measuring devices hitherto known, particularly for mirror-reflex cameras, all suffer to a certain extent from drawbacks which manifest themselves in the measurable initial luminous density, the use of special photoelectric light receivers, the pupillary positions of the exposure lens systems and the influence of the false light entering through the eyepiece. None of the internal measuring methods hitherto known satisfactorily remedies all these disadvantages.

SUMMARY OF THE INVENTION

The purpose of the invention is to ensure an optimum measuring result for an internal exposure measuring device, with a constant ratio between the illumination intensity in the measuring plane and the illumination intensity in the film plane, for any give diaphragm and for all lens systems used. The constant ratio in the internal exposure meter applies particularly to the various possible geometrical distributions of the objects, of which the light and dark proportions, as well as the extent of their contrast, may assume all possible values. The purpose of the invention is to ensure a high degree of efficiency in the optical device for the internal exposure measuring operation, for a varied selection of lens systems with different pupillary positions, limited delustering of the image adjustment system and complete suppression of the influence of the false light emanating from the eyepiece.

The invention enables this object to be achieved by a system in which, behind a partially mirror-coated reflection surface, a light conductor or light collector is provided of which the light entry surface approximately corresponds to the size of the partially mirror-coated reflection surface, whereas the light outlet surface, mounted opposite a photoelectric converter with or without an airgap, is at least three times smaller than the light entry surface. The light conductor is preferably mounted, together with the converter, behind the partially mirror-coated reflection surface of a prism system or mirror system. In certain versions of the invention the light conductor is constructed conically, in the known manner, in which case the basic surface belonging to the light conductor and associated with the partially mirror-coated reflection surface is made oblique in respect of the axis of the cone to the extent required to ensure that it approximately corresponds to the size of the partially mirror-coated reflection surface, whereas the point of the cone is made blunt, in accordance with the position and size of the photoelectric converter, which is preferably a photoelectric resistance of small area. The light conductor is by no means limited to a conical section, and the invention provides that it may be made up of two portions of a cone, with different conical angles, the conical angle adjacent to the partially mirror-coated reflection surface is larger than that adjacent to the photoelectric converter.

In a further version of the invention the light conductor may consist, in the known manner, of a conical cluster of photoconductive fibres. Very satisfactory light collecting results are also obtained with a light conductor consisting of a combination of a portion of a cylinder and a portion of a cone, constructed in such a manner that one of the base surfaces of each of the two parts of the structure is sufficiently oblique in relation to the vertical axes of the structure to ensure that when placed against each other they approximately correspond to the size of the partially mirror-coated reflection surface, whereas the tip of the cone is made blunt in accordance with the position and size of the photoelectric converter. In addition to conical light conductors, their external surface may also be spherical, aspherical, cylindrical or toroidal. Finally, the light conductor can be made up of a pyramidal prismatic system, in which case the different ratio between light entry surface and light outlet surfaces of the light conductor is obtained in the same manner as provided by the invention in the preceding practical examples. In order to ensure that all the light, particularly that emanating from the border zones, is included in the measuring operation in an optimum manner the invention also provides that both the light entry surface of the conical light conductor and that of the pyramidal light conductor is to possess additional power of refraction, e.g. by means of Fresnel rings. This measure will also ensure that the plane of the viewfinder image will be depicted on the photoelectric converter, of the pupillary measuring system is largely independent of the pupillary position.

When the light conductor or light collector is constructed and arranged in accordance with the invention, immediately beyond the partly mirror-coated reflective surface, e.g. of a pentagonal-roof prism, followed by the provision of a photoelectric converter on the light outlet side of the light conductor, this ensures optimum exposure measuring results, exactly in accordance with the demands made on an internal exposure measuring system. The dependence of the measuring system on the pupillary position, such as occurs with interchangeable objectives, when the assortment of objective systems is not constructed for one uniform outlet pupillary position, is hardly of any disadvantage, from a measuring point of view, when the design and arrangement covered by the invention are adopted. The entire viewfinder light flux, entering the prism viewfinder or mirror viewfinder system, will inevitably encounter the partially permeable surface, e.g. image erecting surface, in which case the whole of the part of the light flux allowed to pass through the entire area will in all cases be concentrated on the same area of photoelectric converter, regardless of the particular lens system by which the light is received. The light collecting property of the light conductor, and its design and arrangement in accordance with the invention, ensures a high degree of illumination intensity on the photoelectric converter, so that the measurement will be accurate even in the case of low initial luminous densities. The light conducting devices are designed in such a way that an ordinary commercial photoelectric converter, such as a photoelectric resistance of small area, can be used for the measuring operation, resulting in highly advantageous economy of space, so that miniature cameras with very small housing dimensions can be employed. A further considerable advantage resides in the fact that the light is guided in the light conductor in such a way that the measuring result is completely unaffected by the incidence of any false light emanating from the viewfinder eyepiece.

BRIEF DESCRIPTION OF THE DRAWING

Further advantageous features of the invention will emerge from the description and from the practical examples illustrated in the drawings. A mirror-reflex viewfinder system with photoconductive means and a photoelectric converter are shown schematically by each of the following drawings.

DESCRIPTION OF PREFERRED EMBODIMENTS

Figure 1:
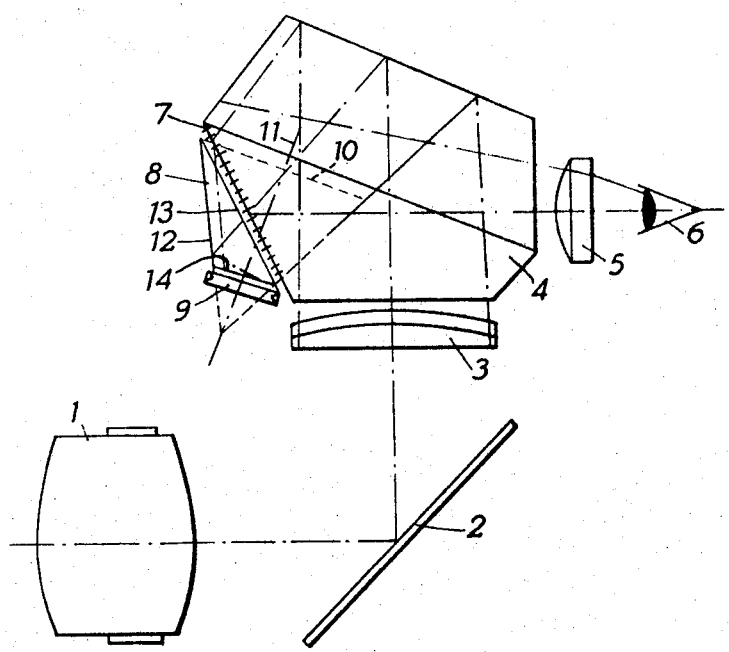
FIGURE 1 is a lateral view with a conical light conductor.
Figure 2:
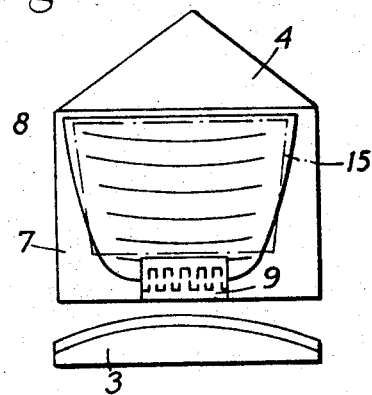
FIGURE 2 is a front view of the system shown in FIGURE 1.

As may be seen from FIGURE 1, the light flux passing from the exposure lens system 1 via the reflex mirror 2 through the image field lens 3 enters the pentgonal-roof prism 4, from which it is perceived by the eye 6 of the observer through the eyepiece 5, after it has been reflected several times. Behind the image erecting surface 7 of the pentagonal prism 4, which is mirror-coated so as to be partly permeable, there is a light conductor or light collector 8, on the light outlet surface of which is mounted a photoelectric converter preferably a photoelectric resistance 9 of a small area, with or without airgap. The light conductor, which is made of organic or inorganic optically transparent material, e.g. of the acryl plastic group, takes the form of part of the cone, as indicated by the full lines of the cone of which the remainder is shown by broken lines. The conical base surface 10 associated with the partially mirror-coated image erecting surface 7 is oblique in respect of the axis 11 to the extent required to ensure that, as seen from FIGURE 2, it will be approximately equal to the size of the partially mirror-coated reflection surface 7. The surface 10 is shown approximately parallel to the roof edge of the prism at the top right in the figure. Both on the generated surface 12 of the cone and on the oblique surface 13 of the light conductor 8, all the light rays passing through the mirror-coated reflection surface 7 are situated in the optical medium of the light conductor, in addition to which the light flux is concentrated in such a manner that on the light outlet surface 14, which is several times smaller than the light entry surface 13, the whole of the light flux passing through the partially mirror-coated reflection surface emerges with a high degree of luminous density, arriving without any appreciable losses on the photoelectric converter 9 situated immediately behind the said surface. It may be seen from FIGURE 2 how the conical light conductor 8 covers the partially mirror-coated reflection surface 7 to the extent to which the viewfinder image 15 associated with the reflection surface 7 and indicated by broken lines is approximately covered by the base surface 13 of the conic section.

Figure 3:
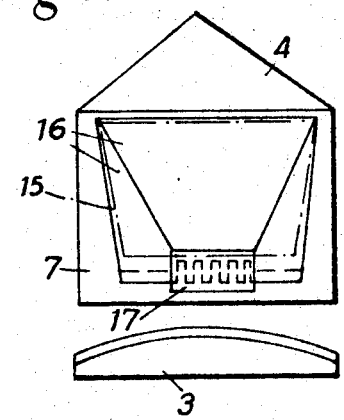
FIGURE 3 is a front view of the same viewfinder system, the light conductor consisting of a pyramidal prismatic system.

FIGURE 3 provides a front view of the same prismatic viewfinder system shown in FIGURE 1. Behind the partially mirror-coated image erecting surface 7 of the pentagonal prism 4 the conical light conductor is replaced by a light conductor made up of a pyramidal prismatic system 16. Here again, and in a similar manner, the base surface made oblique in respect of the axis of the pyramid approximately covers the viewfinder 15 associated with the reflection surface 7 and shown by a broken line. With the light outlet surface of the light conductor 16 is associated a photoelectric converter 17, with or without an airgap.

FIGURES 4, 5, 8 and 9 show light conductors made up of bodies of different geometrical shapes, in which case the light rays passing through from the viewfinder light flux are totally reflected not only by those generated surfaces of the different geometric structures which face towards the lens system but also by that oblique light entry surface of the light conductor which faces towards the partially permeable mirror-coated reflection surface 7 of the pentagonal prism 4. The light rays emerging on the light outlet surface of the light conductor encounter the photoelectric converter.

Figure 4:
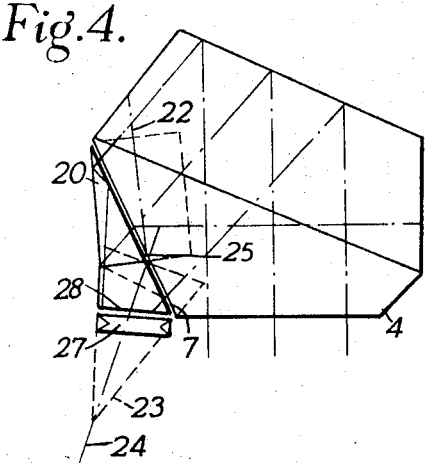
FIGURE 4 is a lateral view, with a combined conical and cylindrical light conductor.
Figure 5:
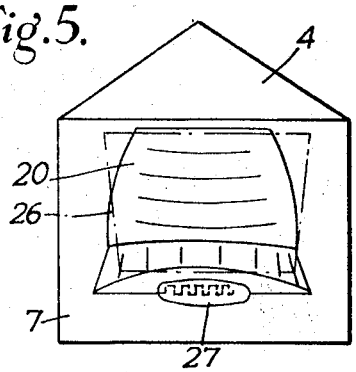
FIGURE 5 is a front view of the system shown in FIGURE 4.

The light conductor 20 shown in FIGURES 4 and 5 and made in one piece is constructed geometrically from a portion of a cylinder and a portion of a cone. Those portions of the structure which are shown by broken lines consist of a cylinder 21 with its axis 22 and a cone 23 with its axis 24. The generated surfaces of the different parts 21 and 23 of the structure face towards the exposure lens system, whereas the base surfaces of the two parts 21 and 23 of the structure are made oblique in respect of their axes 22 and 24 to the extent required to ensure that when placed together they provide a common oblique surface 25 and correspond to the size of the partially mirror-coated reflection surface 7 of the pentagonal prism 4 and with the size 26 of the viewfinder, shown by broken lines. The tip of the cone 23 is made blunt, in accordance with the size and position of the photoelectric converter, for which purpose a photoelectric resistance 27 of small area is preferably used so that the light outlet surface 28 of the light conductor 20 is several times smaller than the oblique surface 25.

Figure 8:
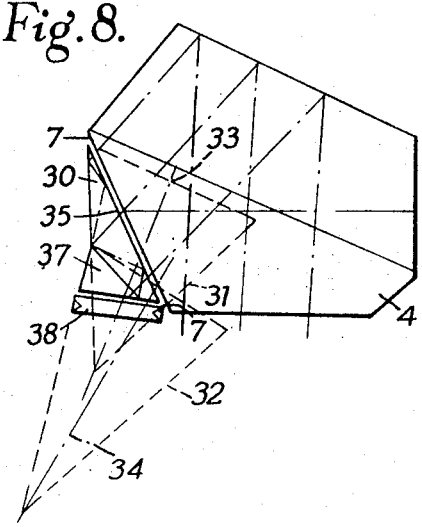
FIGURE 8 is a lateral view with two combined conical light conductors.
Figure 9:
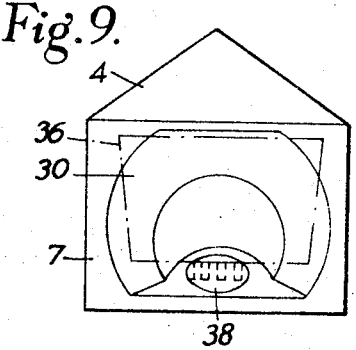
FIGURE 9 is a front view of the system shown in FIGURE 8.

The light conductor 30 shown in FIGURES 8 and 9 and likewise made in one piece is constructed geometrically from two conic sections with different conical angles. The parts of the structure which are shown schematically by broken lines consist of cones 31 and 32 with their axes 33 and 34 the conical angle corresponding to the partially mirror-coated reflection surface of the pentagonal prism 4 being larger than the conical angle associated with the photoelectric converter. The generated surfaces of the portions 31 and 32 of the cone, as shown by the thick unbroken lines, face towards the exposure lens, whereas the base surface of the cone 31 is oblique in respect of the axis 33 of the cone to the extent required to ensure that the resulting oblique surface 35 corresponds approximately to the size of the partially mirror-coated reflection surface 7 of the pentagonal prism 4 and with the size 36 of the viewfinder image, shown by broken lines. The light outlets surface 37, which is adapted to the position and size of the photoelectric converter, preferably consisting of a photoelectric resistance 38 of small area, is obtained by making the base surface of the cone 32 oblique in respect of the access 34 of the cone, as far as the generated surface of the cone.

Figure 6:
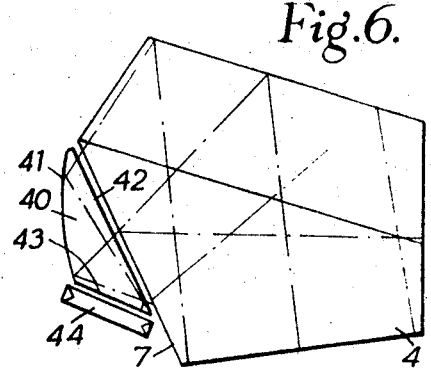
FIGURE 6 is a lateral view, with a light conductor having a convex external surface.
Figure 7:
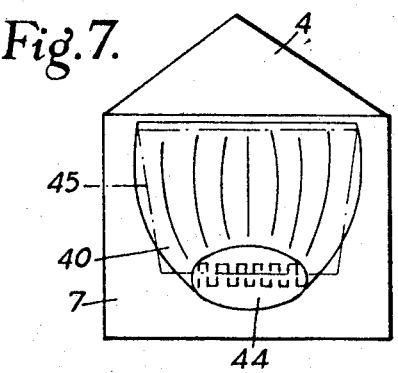
FIGURE 7 is a front view of the system shown in FIGURE 6.

FIGURES 6 and 7 show a light conductor 40 in which the generated surface facing towards the exposure lens system is spherical, aspherical, cylindrical or toroidal. In the same manner as in the preceding examples, the rays of light allowed to pass through the partially mirror-coated reflection surface 7 of the pentagonal prism 4 are totally reflected from the walls 41 and 42 inside the light conductor 40, so that the whole of the reflected light fluxes connected in the light conductor, emerging from the light conductor 40 via the light outlet surface 43 and encountering the surface of the photoelectric converter 44. The size of the oblique surface 42 corresponds approximately to the size 45 of the viewfinder image, see FIGURE 7.

Figure 10:
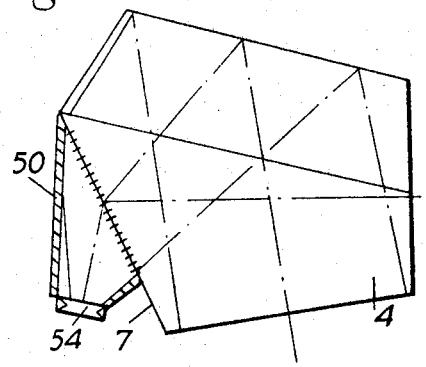
FIGURE 10 is a lateral view, the light conductor consisting of a conical hollow body.
Figure 11:
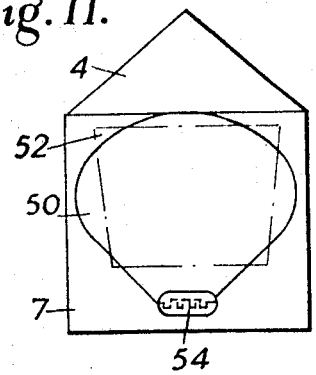
FIGURE 11 is the front view of the system shown in FIGURE 10.

In FIGURES 10 and 11 the partially mirror-coated image-erecting surface of the pentagonal prism 4 bears an internally mirror-coated conical hollow body of which the base surface is made oblique in respect of the axis of the cone to the extent required to ensure that the oblique annular surface approximately covers the size of the viewfinder image 52 (see FIGURE 11) shown by broken lines. Owing to the conical tapering of the light conductor 50, as is well known, the effective luminous intensity is increased, so that the whole of the light flux passing through the partially mirror-coated reflection surface 7 encounters the photoelectric converter 54 without any appreciable losses. That surface of the converter 54 which receives the viewfinder light flux is at least three times smaller than the reflection surface 7 which belongs to the pentagonal prism 4 and which gives passage to the viewfinder flux.

Figure 12:
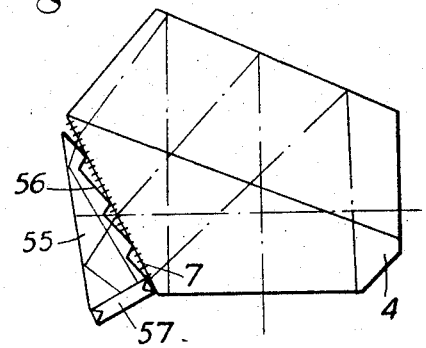
FIGURE 12 is a side view, with a light conductor of a special conical or pyramidal design.
Figure 13:
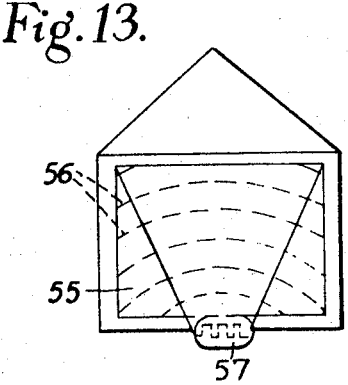
FIGURE 13 is a front view of the system shown in FIGURE 12.

FIGURES 12 and 13 show part of a conical and pyramidal light conductor 55, with the sole difference that the light entry surface is provided by Fresnel rings 56. The introduction of this additional refractive power ensures that the plane of the viewfinder image will be depicted on the photoelectric converter. This renders the measuring system largely independent of the pupillary position. The photoelectric converter 57 is mounted, with or without an airgap, on the light outlet surface of the light conductor 55; it is several times smaller than the partially mirror-coated image erecting surface of the pentagonal prism 4.

Figure 14:
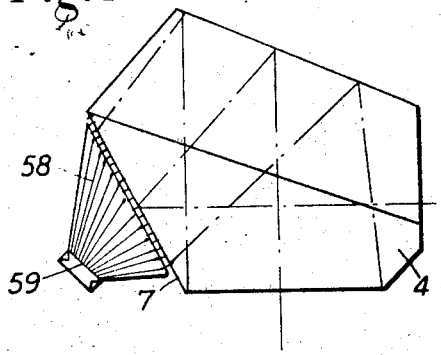
FIGURE 14 is a lateral view, with a conical light conductor made up of clusters of fibres.
Figure 15:
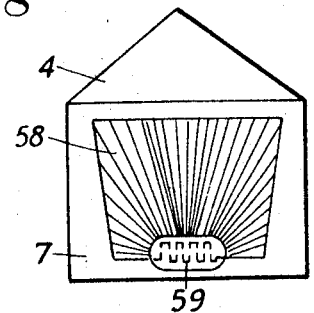
FIGURE 15 is a front view of the system shown in FIGURE 14.

FIGURES 14 and 15 illustrate an example of the light conductor, the conical light conductor 58 consisting in a manner known in itself, of a photo-conductive cluster of fibres, of which the light entry surface is adapted to the size of the partially mirror-coated reflection surface 7 of the pentagonal prism 4, whereas the light outlet surface is adapted to the size of the photoelectric converter 59.

The invention provides that the system in which the light conductor is mounted behind the partially mirror-coated reflection surface can be applied to a variety of ray deflecting systems, e.g. pentagonal-roof prisms, Porro prisms and other prism or mirror systems.

We claim:

1. A photographic mirror reflex camera comprising an exposure lens device, a reflex mirror, an image field lens, a pentagonal roof prism, and an eyepiece arranged in optical succession; said prism having an image erecting surface mirror coated and partly permeable by light, said surface being remote from the eyepiece, a light collector device located directly opposite to said erecting surface, and a photoelectric cell located directly opposite said collector device; said collector device having the shape of part of a geometric figure which tapers from a base surface to an apex which is directed towards the exposure lens device; the apex being removed to provide a flat surface which is directly opposite to the photoelectric cell; said base being approximately parallel to the roof edge of said roof prism remote from said apex; the base part being removed to form a plane surface approximately the same size as the said erecting surface.

2. A camera according to claim 1, wherein the light collector device is made up of two conic sections with different conical angles, the conical angle adjacent to the erecting surface being greater than the conical angle adjacent to the photoelectric cell.

3. A camera according to claim 1, wherein the light collector device is in the form of an internally mirror-coated conical hollow body.

4. A camera according to claim 1, wherein the light entry surface of the light collector device is provided with Fresnel rings.

5. A camera according to claim 1, wherein the light collector device consists of a photoconductive cluster of fibres of which the light entry surface is adapted to the size of the erecting surface, whereas the light outlet surface is adapted to the size of the photoelectric cell.

6. A camera according to claim 1, wherein the light collector device is made of part of a cylinder and part of a cone, one base surface of each of the two parts of the structure being made oblique in respect of the vertical axis of the part in question, to the extent necessary to ensure that when the surfaces are placed together they correspond to the size of the erecting surface.

7. A camera according to claim 1, wherein that generated surface of the light collector device which faces towards the exposure lens device is spherical.

8. A camera according to claim 1, wherein that generated surface of the light collector device which faces towards the exposure lens device is aspherical.

9. A camera according to claim 1, wherein that generated surface of the light collector device which faces towards the exposure lens device is cylindrical.

10. A camera according to claim 1, wherein that generated surface of the light collector device which faces towards the exposure lens device is toroidal.

11. A camera according to claim 1, wherein the light collector device consists of a pyramidal prismatic system of which the base surface is made oblique in respect of the vertical axis of the pyramid to the extent required to ensure that it corresponds approximately to the size of the erecting surface, whereas the apex of the pyramid is made blunt in accordance with the size of the photoelectric cell.

12. A camera according to claim 1 having means mounted on the light outlet surface of the light collector device for supporting the photoelectric cell.

13. A camera according to claim 1, wherein the light collector device consists of an optically transparent plastic material.

References Cited
UNITED STATES PATENTS
3,332,330   7/1967   Broschke et al. _____ 95—42

NORTON ANSHER, Primary Examiner

R. L. MOSES, Assistant Examiner

U.S. Cl. X.R.
95—10